Dec. 10, 1940.   H. T. AHRENS   2,224,625
COTTON TREATING APPARATUS
Filed July 19, 1939    2 Sheets-Sheet 1
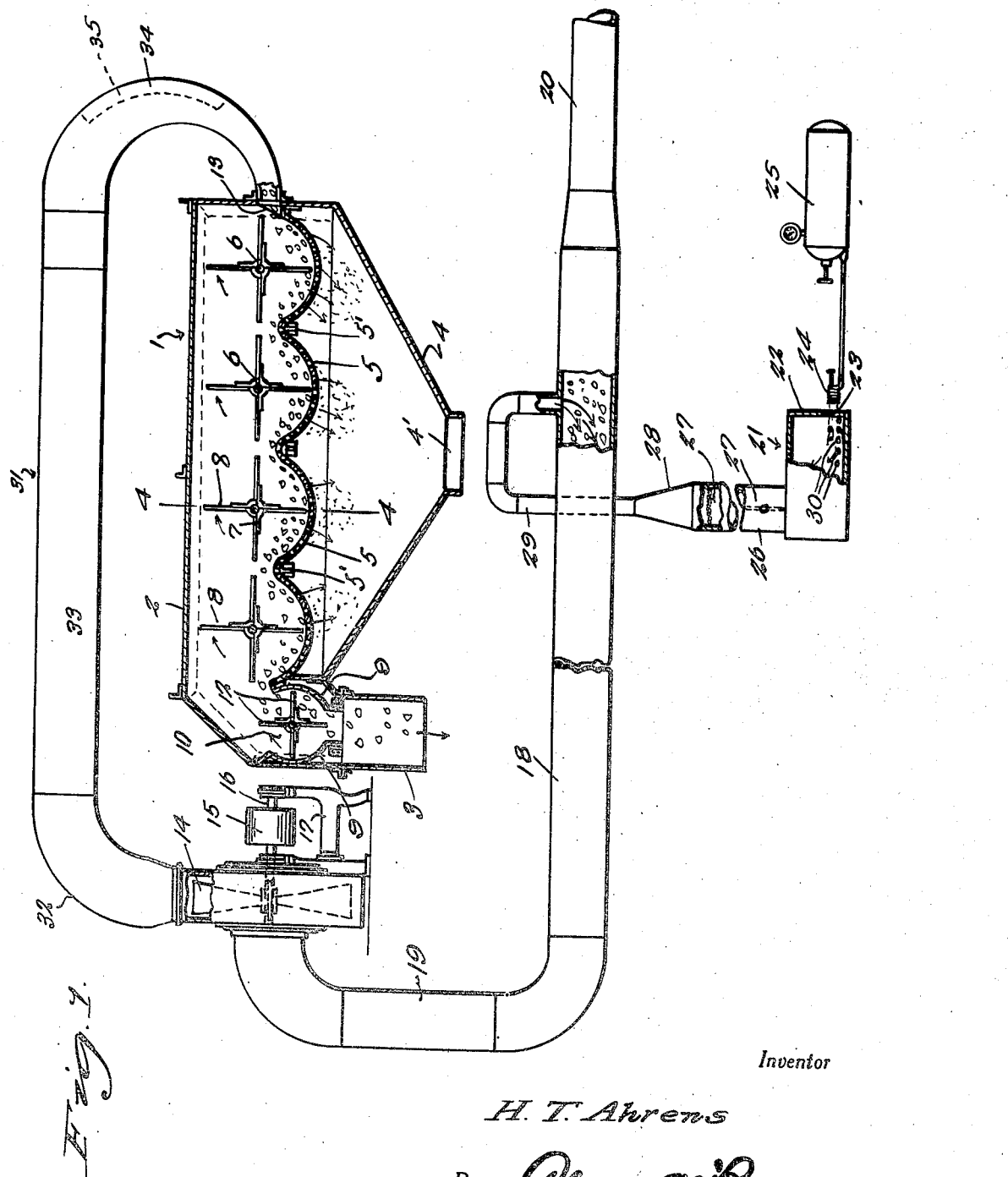
Inventor
H. T. Ahrens
By Clarence A. O'Brien
and Hyman Berman
Attorneys Dec. 10, 1940.  H. T. AHRENS  2,224,625
COTTON TREATING APPARATUS
Filed July 19, 1939   2 Sheets-Sheet 2
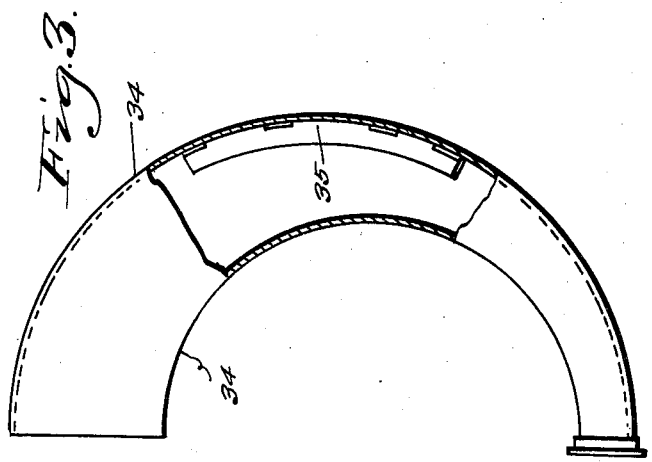
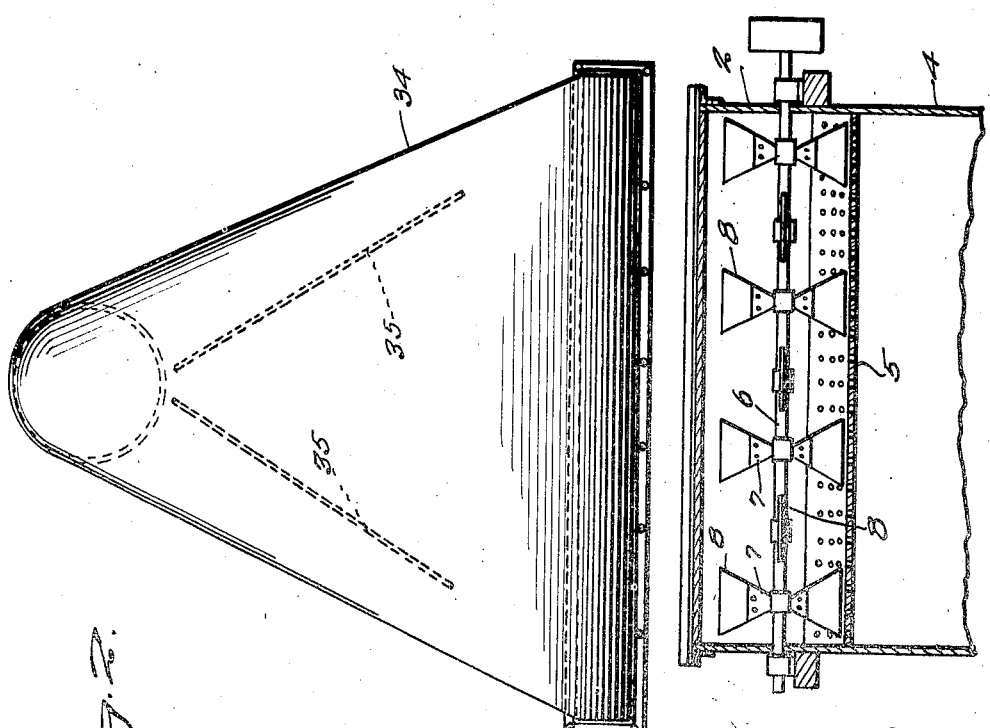
Inventor
H. T. Ahrens
By Clarence A. O'Brien
and Hyman Berman
Attorneys Patented Dec. 10, 1940

2,224,625

UNITED STATES PATENT OFFICE 2,224,625

COTTON TREATING APPARATUS

Henry T. Ahrens, Charlotte, Tex.

Application July 19, 1939, Serial No. 285,443

1 Claim. (Cl. 19—93)

My invention relates to improvements in cotton treating apparatus of the drying and cleaning type and is designed as an improvement over the apparatus disclosed in my co-pending application Serial No. 210,502, filed May 22, 1938, since matured into Patent No. 2,169,782 issued Aug. 15, 1939.

The principal object of the present invention is to provide a combination drying and cleaning apparatus of high efficiency and simple construction equipped for drying the cotton under the action of heat and both suction and air pressure and for feeding the dried cotton in a spread out loose condition to cleaning apparatus.

My invention also comprehends other and subordinate objects all of which together with the precise nature of my improvements will be readily understood when the succeeding description and claim are read with reference to the drawings accompanying and forming part of this specification.

In said drawings—

Figure 1 is a view partly in longitudinal section and partly in side elevation of a preferred embodiment of the invention, Figure 2 is a view in front elevation of the discharge section of the blower conduit drawn to an enlarged scale, Figure 3 is a view in side elevation of said section partly broken away, and Figure 4 is a view in transverse section taken on the line 4—4 of Figure 1.

Referring to the drawings by numerals, the illustrated embodiment of the invention includes a cleaning unit 1 of the general type shown in my copending application, supra, with the exception presently noted. This type of cleaning unit comprises a horizontally rectangular casing 2 of sheet metal closed at its top and ends and provided with a subjacent discharge spout 3 extending across one end thereof, hereinafter referred to as the discharge end, a hopper bottom 4 extending from the discharge spout 3 to the other end, hereinafter termed the feed end, and an outlet aperture 4' in the bottom of the hopper bottom 4. Immediately above the hopper bottom 4 is a horizontal partition extending from the feed end of the casing 2 and terminating short of the discharge end thereof, said partition comprising a series of successive, perforated concaves 5 supported by beams 5' extending transversely of said casing 2 and suitably secured thereto. Rotatably mounted in the side walls of the casing 2 above said concaves 5 to extend transversely of the casing concentrically of said concaves is a plurality of beater shafts 6, one for each concave. The shafts 6 are equipped with radial beater arms 7 suitably fixed thereto in opposed pairs, the pairs alternating in 45° angular relation and being equipped at the outer ends thereof with flexible substantially V-shaped beater blades 8 adapted under rotation of the shafts to sweep the bottom of the concaves 4. The shafts 6 are designed to be rotated by any suitable means, not shown, in unison and in a direction to sweep cotton entering the feed end of the casing 2 toward the discharge end thereof. Between the discharge end of the casing 2 and the adjacent end of the described partition, and immediately above the discharge spout 3, is an air valve into which the cotton passes from the last concave 4 and through which said cotton passes to the spout 3. The air valve comprises a pair of opposed concavo-convex metal plates 9 extending across said casing 2 and forming, together with the sides of the casing, a partially cylindrical valve chamber 10 open at its top and bottom. The plate 9 may be secured in the casing 2 in any suitable manner. A shaft 11 is suitably journaled at its ends in the sides of the casing 2, axially of said chamber 10, and has fixed thereon radial blades 12 of flexible material extending from end to end of said chamber 10 and wipingly engaging the plates 9, said blades 12 and the opening in the bottom of the chamber 10 being relatively arranged and constructed so that said blades in any position thereof seal said chamber 10 against passage of air therethrough by way of the open bottom thereof. The shaft 11 is designed to be rotated in unison with the shafts 6 as will be understood. The feed end of the casing 2 is provided with a feed slot 13 therein extending across said end immediately above the top of the concaves 5.

The cotton in the casing 2 is beaten and agitated therein by the blades 8 and fed over the concaves 5 to the described air valve and the discharge spout 3. The foreign matter extracted from the cotton, in this operation, falls through the concaves 5 into and through the hopper bottom 4.

Adjacent to the discharge end of the casing 2 is a combined suction and blower fan 14 adapted to be driven by a pulley 15 on the fan shaft 16 journaled at one end in bearing bracket 17. Below the described cleaning unit 1 is a horizontally disposed combined heating and suction conduit line 18, preferably circular, having an upstanding discharge end 19 communicating with the casing of the fan 14 axially of the latter, said conduit being provided with a somewhat reduced intake end 20 for drawing in cotton from a source of supply, not shown. At a suitable point below the conduit 18 is a hot air generator 21 having the form of a box-like casing 22 provided in one side thereof, and adjacent to its bottom, with an aperture 23 for the insertion therethrough into the casing 22 of the nozzle 24 of a suitable air pressure liquid burner represented as a unit by the numeral 25. At the side of the casing 22 opposite the aperture 23, a heat discharge pipe 26 arises from said casing with a damper 27 therein and a filter screen 27' above said damper. The upper end of the pipe 26 is reduced, as at 28, and has connected thereto a smaller gooseneck pipe 29 opening into the top of the conduit 18 adjacent the end 20 of the latter. A plurality of heat retaining rods 30 extend across the casing 22 within the same and close to the bottom thereof.

A circular pressure line conduit 31 connects the top of the casing of the fan 14 with the feed slot 13 of the casing 2, said conduit comprising an elbow section 32 arising from said fan casing, a straight section 33 extending from the elbow horizontally above the casing 2, and an elbow-like nozzle section extending from the section 33 to the feed slot 13. The nozzle section 34, which as will be understood comprises the discharge end of the conduit 31, flares laterally to a width corresponding substantially to that of the feed end of the casing 2 and tapers in thickness to said slot 13, whereby a flattened wedge-shape is imparted thereto.

Within the nozzle section 34 and extending perpendicularly from the rear wall thereof, that is the longer wall thereof, is a pair of baffle fins 35 diverging downwardly and located intermediate the ends of the nozzle section and the side walls thereof.

Referring now to the operation, from the source of supply, the cotton is carried by suction through the conduit 18 to the suction and blower fan 14. As it leaves the reduced end 20 of the conduit 18 it spreads out. The heat generated by the generator 21 is drawn into the spread-out cotton in the conduit 18, through pipe 29 under the suction from the suction and blower fan 14 and travels with the cotton through said conduit 18 to said fan. From the fan 14 the cotton and heat are forced under air pressure, that is to say blown, into the cleaning unit 1 by way of the described conduit 31. As the cotton enters the nozzle section 34 it spreads out, or scatters, which action is facilitated by the described baffle fins 35 deflecting the same toward the sides of said section. Thus, as will readily be seen, the cotton is uniformly dried before it enters the cleaning unit 1. The heated air blown into the unit 1 with the cotton escapes through the concaves 5 and hopper bottom 4 with the foreign matter extracted from the cotton in the cleaning operation previously described. The cleaned and dried cotton is discharged through the spout 3. The described rods 27 function to store heat and radiate the same. The damper 27 functions to regulate the amount of heated air or gas passing to the conduit 18. The filter screen 27' blocks the passage of soot to the conduit 18. The reduction 28 in the pipe 26 prevents the blaze from being drawn from the generator 21 into the conduit 18.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

The combination with a cotton cleaning unit including a horizontally disposed casing, having a feeding end, of means to feed cotton from a source of supply to said end comprising a combined suction and blower fan adjacent the opposite end of said unit and having a suction side and a blower side, a suction line extending from said suction side and having an intake end for loading from said source of supply, a heat generator adjacent said suction line, a heat discharge line extending from said generator to said suction line adjacent to the intake end of the latter, and a pressure line extending from the blower side of said fan to the feeding end of said unit, said pressure line terminating at said feeding end of the unit in a flaring nozzle providing for spreading of the cotton therein, and baffle fins in said nozzle disposed in diverging relation in the direction of flow of the cotton for facilitating spreading of the cotton in said nozzle.

HENRY T. AHRENS.